US011975620B2

(12) United States Patent
Tombelli et al.

(10) Patent No.: US 11,975,620 B2
(45) Date of Patent: May 7, 2024

(54) POWER TRANSFER SYSTEM FOR ELECTRIC VEHICLES AND A CONTROL METHOD THEREOF

(71) Applicant: ABB Schweiz AG, Baden (CH)

(72) Inventors: Fabio Tombelli, Terranuova Bracciolini (IT); Pawel Blaszczyk, Wieliczka (PL); Marco Lega, Montevarchi (IT); Oscar Apeldoorn, Lengnau (CH)

(73) Assignee: ABB E-Mobility B.V., Delft (NL)

( * ) Notice: Subject to any disclaimer, the term of this patent is extended or adjusted under 35 U.S.C. 154(b) by 297 days.

(21) Appl. No.: 17/050,011

(22) PCT Filed: Apr. 23, 2018

(86) PCT No.: PCT/EP2018/060318
§ 371 (c)(1),
(2) Date: Oct. 23, 2020

(87) PCT Pub. No.: WO2019/206393
PCT Pub. Date: Oct. 31, 2019

(65) Prior Publication Data
US 2021/0178915 A1 Jun. 17, 2021

(51) Int. Cl.
*B60L 53/12* (2019.01)
*B60L 53/62* (2019.01)
(Continued)

(52) U.S. Cl.
CPC ............ *B60L 53/12* (2019.02); *B60L 53/62* (2019.02); *H02J 7/04* (2013.01); *H02J 50/12* (2016.02); *H02J 50/80* (2016.02); *H02J 2207/20* (2020.01)

(58) Field of Classification Search
CPC ...... B60L 53/12; B60L 53/122; B60L 53/124; B60L 53/126
See application file for complete search history.

(56) References Cited

U.S. PATENT DOCUMENTS 9,184,633 B2 * 11/2015 Obayashi ............... H02J 50/80
9,437,362 B2    9/2016 Kim
(Continued)

FOREIGN PATENT DOCUMENTS

CN    107618388 A    1/2018
CN    107750412 A    3/2018
(Continued)

OTHER PUBLICATIONS

European Patent Office, International Search Report & Written Opinion issued in corresponding Application No. PCT/EP2018/060318, dated Dec. 20, 2018, 15 pp.
(Continued)

*Primary Examiner* — Judy Nguyen
*Assistant Examiner* — James Split
(74) *Attorney, Agent, or Firm* — Armstrong Teasdale LLP (57) ABSTRACT

A power transfer system for supplying electric power to a battery of an electric vehicle including a control architecture capable of controlling the transmission of electric power to a battery of the electric vehicle and, at the same time, capable of providing frequency control functionalities to optimize power transmission efficiency. In a further aspect, the invention relates to a method for controlling a power transfer system.

16 Claims, 4 Drawing Sheets

(51) Int. Cl.
*H02J 7/04* (2006.01)
*H02J 50/12* (2016.01)
*H02J 50/80* (2016.01)

(56) References Cited

U.S. PATENT DOCUMENTS

| | | | |
|---|---|---|---|
| 10,097,045 B2* | 10/2018 | Guidi | H02J 50/10 |
| 2004/0201361 A1 | 10/2004 | Koh | |
| 2009/0174263 A1* | 7/2009 | Baarman | H02J 50/12 |
| | | | 307/104 |
| 2012/0286724 A1 | 11/2012 | Tsai | |
| 2013/0033228 A1* | 2/2013 | Raedy | B60L 53/126 |
| | | | 320/108 |
| 2013/0063160 A1 | 3/2013 | Nakano | |
| 2013/0119925 A1 | 5/2013 | Kawamura | |
| 2013/0249480 A1 | 9/2013 | Paparo | |
| 2014/0042967 A1 | 2/2014 | Herzog | |
| 2014/0159501 A1 | 6/2014 | Kanno | |
| 2014/0340027 A1 | 11/2014 | Keeling | |
| 2015/0214748 A1 | 7/2015 | Lin | |
| 2015/0280455 A1 | 10/2015 | Bosshard et al. | |
| 2015/0303714 A1 | 10/2015 | Keeling | |
| 2015/0318900 A1 | 11/2015 | Shimokawa | |
| 2017/0025903 A1 | 1/2017 | Song | |
| 2017/0267111 A1* | 9/2017 | Ochi | H02J 7/02 |
| 2017/0338685 A1 | 11/2017 | Jung | |
| 2018/0342878 A1* | 11/2018 | Nagaoka | H02J 7/00034 |
| 2018/0358843 A1* | 12/2018 | Misawa | H01F 38/14 |
| 2021/0162875 A1 | 6/2021 | Tombelli | |

FOREIGN PATENT DOCUMENTS

| | | |
|---|---|---|
| EP | 2530812 A1 | 12/2012 |
| KR | 20140031709 A | 3/2014 |
| WO | 2012005607 A2 | 1/2012 |
| WO | 2017026721 A1 | 2/2017 |

OTHER PUBLICATIONS

European Patent Office, International Search Report & Written Opinion issued in corresponding Application No. PCT/EP2018/058936, dated Dec. 20, 2018, 17 pp.

European Patent Office, International Search Report & Written Opinion issued in corresponding Application No. PCT/EP2018/058930, dated Dec. 20, 2018, 17 pp.

* cited by examiner

POWER TRANSFER SYSTEM FOR ELECTRIC VEHICLES AND A CONTROL METHOD THEREOF

The present invention relates to the field of power transfer systems for electric vehicles. In particular, the present invention regards an inductive power transfer system capable of exchanging electric power between an electric power system and a battery on board an electric vehicle, in a wireless manner.

Wireless inductive power transfer systems for electric vehicles are well known in the state of the art.

Typically, these systems are used to charge the electric battery of an electric vehicle.

When used as a battery charging systems, wireless inductive power transfer systems employ a transmitter coil, which is placed on or embedded in a ground surface, to inductively transmit electric power to a receiver coil mounted on board an electric vehicle through the air gap between the road surface and the vehicle itself.

As in traditional transformers, an AC current flowing in the winding of the transmitter coil produces a magnetic flux making an induced AC current to flow in the winding of the receiver coil. In this way, electric power may be inductively transferred from the transmitter coil to the receiver coil.

When used as battery charging systems, wireless power transfer systems for electric vehicles typically include a transmitter-side section, which normally includes the transmitter coil and a power supply system connectable to the mains to feed the transmitter coil, and a receiver-side section, which normally includes, on board the electric vehicle, the receiver coil and a power conversion system to feed the battery with electric power inductively received by the receiver coil.

Both the transmitter-side section and the receiver-side section of the power transfer system include a number of controllers to control their operation. Controllers arranged at different sections can mutually communicate through a dedicated communication channel, which is typically a wireless communication channel, e.g. of the Wi-Fi type.

In order to ensure a suitable charging process of the battery on board the electric vehicle, electric power transferred to the battery has to be properly controlled according to a charging profile that is typically set-up depending on the characteristics and state-of-charge of the battery and on other additional aspects, such as the reduction of the energy consumption during a charging cycle, the reduction of the time required for the charging process, and the like.

For this reason, controllers of a wireless power transfer system for electric vehicles typically implement control architectures configured to control the operation of the above-mentioned power supplying system as a function of the selected power transfer profile.

Control arrangements currently used in power transfer systems of the state of the art often show poor performances in optimizing power exchange efficiency in consideration of the on-going operative conditions.

As a consequence, currently available power transfer systems may operate inefficiently and require unpredictably prolonged time to carry out a desired power exchange process between the electric power system and the battery on board the electric vehicle.

The main aim of the present invention is to provide a wireless power transfer system for electric vehicles, which allows overcoming the above-described disadvantages.

Within this aim, another object of the present invention is to provide a wireless power transfer system ensuring a suitable exchange of electric power between an electric power system and a battery on board a vehicle, in accordance with a given power transfer profile.

Another object of the present invention is to provide a wireless power transfer system ensuring good performances in optimizing power exchange efficiency, even when sudden and unpredictable changes in the operating conditions of the power transfer system occur.

Another object of the present invention is to provide a wireless power transfer system relatively easy and inexpensive to arrange and produce at industrial level.

The above aim and objects, together with other objects that will be more apparent from the subsequent description and from the accompanying drawings, are achieved by a power transfer system for electric vehicles, according to the following claim 1 and the related dependent claims.

In a general definition, the power transfer system, according to the invention, comprises:

a transmitter-side power sub-system adapted to exchange AC electric power with said electric power system, said transmitter-side power sub-system comprising a first rectifying stage electrically coupleable with said electric power system, a DC-bus stage electrically coupled with said first rectifying stage and an inverter stage electrically coupled with said DC-bus stage;

a transmitter-side coil sub-system adapted to exchange AC electric power with said transmitter-side power sub-system, said transmitter-side coil sub-system comprising a transmitter coil electrically coupled with said inverter stage;

a receiver-side coil sub-system comprising a receiver coil inductively coupleable with said transmitter coil, said transmitter-side coil sub-system and said receiver-side coil sub-system forming a resonant electric circuit for the exchange of AC electric power, when said transmitter coil and said receiver coil are inductively coupled;

a receiver-side power sub-system adapted to exchange AC electric power with said receiver-side coil sub-system and DC electric power with said battery, said receiver-side power sub-system comprising a second rectifying stage electrically coupled with said receiver coil;

control means comprising transmitter-side control means, adapted to control operation of said transmitter-side power sub-system and transmitter-side coil sub-system, and receiver-side control means adapted to control operation of said receiver-side coil sub-system and receiver-side power sub-system, said transmitter-side and receiver-side control means being capable to mutually communicate through a wireless communication channel.

Said control means are adapted to control a DC electric power exchanged with said battery and are adapted to control an operating frequency of a first AC current circulating along said transmitter coil to track a resonant frequency of the resonant electric circuit formed by said transmitted-side coil sub-system and said receiver-side coil sub-system.

Preferably, said control means are adapted to provide frequency variations of an operating frequency of said first AC current and observe variations of one or more electric quantities of said power transfer system in response to said frequency variations to track said resonant frequency.

Preferably, said control means are adapted to:
control operation of said inverter stage to obtain said first AC current with a varied frequency obtained by imposing a frequency variation of an operating frequency of said first AC current;
calculate variations of one or more electric quantities of said power transfer system in response to the obtaining of said first AC current having said varied frequency;
determine whether said varied frequency is closer to or farther from said resonant frequency depending on the calculated variations of said one or more electric quantities;
control operation of said inverter stage to obtain said first AC current with an operating frequency set depending on the results of said determination.

Preferably, said DC-bus stage includes a DC/DC converter and has a first port electrically coupled with said first rectifying stage and a second port electrically coupled with said inverter stage.

Preferably, said control means are adapted to:
control operation of said first rectifying stage to obtain a first DC voltage having said minimum value;
control operation of said DC/DC converter to obtain a second DC voltage having said requested value;
if a value requested for a second DC voltage at said second port is lower or equal to a possible minimum value for a first DC voltage at said first port.

Preferably, said control means are adapted to:
control operation of said first rectifying stage to obtain a first DC voltage having a value equal to the value requested for said second DC voltage;
control operation of said DC/DC converter to obtain a second DC voltage equal to said first DC voltage;
if a value requested for a second DC voltage at said second port is higher than a possible minimum value for a first DC voltage at said first port.

In a further aspect, the present invention related to a method for controlling a power transfer system, according to the following claim 10 and the related dependent claims.

The power transfer system comprises:
a transmitter-side power sub-system adapted to exchange AC electric power with said electric power system, said transmitter-side power sub-system comprising a first rectifying stage electrically coupleable with said electric power system, a DC-bus stage electrically coupled with said first rectifying stage and an inverter stage electrically coupled with said DC-bus stage;
a transmitter-side coil sub-system adapted to exchange AC electric power with said transmitter-side power sub-system, said transmitter-side coil sub-system comprising a transmitter coil electrically coupled with said inverter stage;
a receiver-side coil sub-system comprising a receiver coil inductively coupleable with said transmitter coil, said transmitter-side coil sub-system and said receiver-side coil sub-system forming a resonant electric circuit for the exchange of AC electric power, when said transmitter coil and said receiver coil are inductively coupled;
a receiver-side power sub-system adapted to exchange AC electric power with said receiver-side coil sub-system and DC electric power with said battery, said receiver-side power sub-system comprising a second rectifying stage electrically coupled with said receiver coil.

The method, according to the invention, comprises controlling a DC electric power exchanged with said battery and controlling an operating frequency of a first AC current circulating along said transmitter coil to track a resonant frequency of the resonant electric circuit formed by said transmitted-side coil sub-system and said receiver-side coil sub-system.

Preferably, the method comprises providing frequency variations of an operating frequency of said first AC current and observing variations of one or more electric quantities of said power transfer system in response to said frequency variations to track said resonant frequency.

Preferably, the method comprises the following steps:
controlling operation of said inverter stage to obtain said first AC current with a varied frequency obtained by imposing a frequency variation of an operating frequency of said first AC current;
calculating variations of one or more electric quantities of said power transfer system in response to the obtaining of said first AC current having said varied frequency;
determining whether said varied frequency is closer to or farther from said resonant frequency depending on the calculated variations of said one or more electric quantities;
controlling operation of said inverter stage to obtain said first AC current with an operating frequency set depending on the results of said determination.

Preferably, said DC-bus stage includes a DC/DC converter and has a first port electrically coupled with said first rectifying stage and a second port electrically coupled with said inverter stage.

Preferably, the method comprises the following steps:
if a value requested for a second DC voltage at said second port is lower or equal to a possible minimum value for a first DC voltage at said first port:
controlling operation of said first rectifying stage to obtain a first DC voltage having said minimum value;
controlling operation of said DC/DC converter to obtain a second DC voltage having said requested value;
if a value requested for a second DC voltage at said second port is higher than a possible minimum value for a first DC voltage at said first port:
controlling operation of said first rectifying stage to obtain a first DC voltage having a value equal to the value requested for said second DC voltage;
controlling operation of said DC/DC converter to obtain a second DC voltage equal to said first DC voltage.

Further characteristics and advantages of the present invention will be more apparent with reference to the description given below and the accompanying figures, provided purely for explanatory and non-limiting purposes, wherein.

Figure 1:
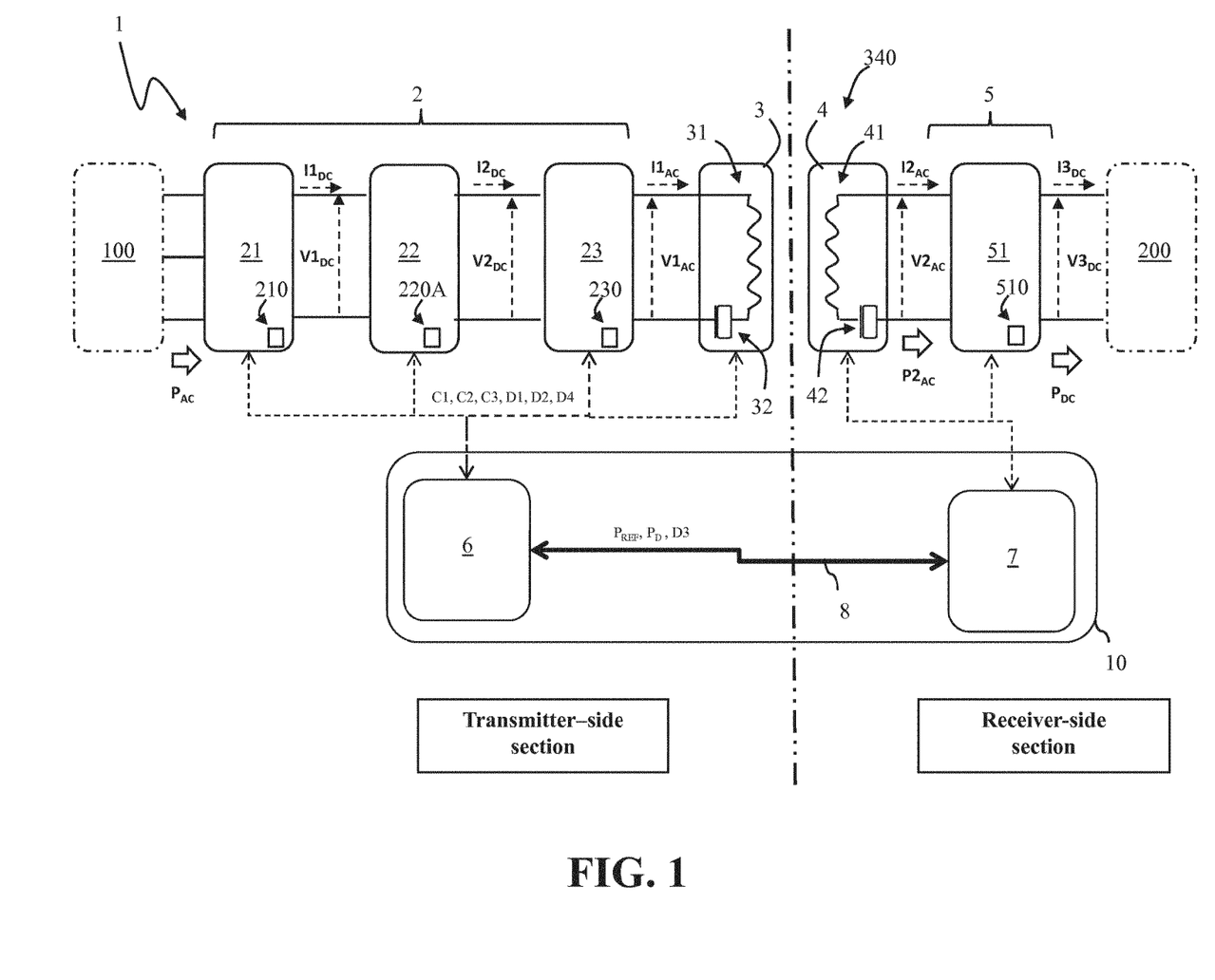
FIG. 1 schematically illustrates the power transfer system, according to the present invention.

With reference to FIG. 1, the present invention refers to a power transfer system 1 for electric vehicles capable of exchanging electric power between an electric power system 100 and a battery 200 on board an electric vehicle, in a wireless manner.

The power transfer system 1 is particularly adapted to be used as a battery charging system capable of transferring electric power harvested from an electric power system 100

(e.g. the mains) to a battery 200 on board an electric vehicle 101 and it will be described with specific reference to this application for the sake of simplicity.

However, the power transfer system 1 may be suitable to implement bidirectional power transfer functionalities and therefore it may be employed to transfer electric power from the battery 200 to the electric system 100.

Referring to its application as battery charging system, the power transfer system 1 comprises a transmitter-side section and a receiver-side section, which respectively include a number of power sub-systems and components arranged off-board and on-board the electric vehicle.

At the transmitter-side section, the power transfer system 1 comprises a transmitter-side power sub-system 2 electrically coupleable with the electric power system 100 and adapted to exchange AC electric power $P_{AC}$ with this latter.

The transmitter-side power sub-system 2 comprises a first AC/DC rectifying stage 21 electrically coupleable with the electric power system 100 and conveniently adapted to provide a first DC current $I1_{DC}$ and a first DC voltage $V1_{DC}$.

Preferably, the first rectifying stage 21 includes a filter and a switching converter (not shown) electrically coupled in cascade.

Preferably, the first rectifying stage 21 includes power switches controllable by means of suitable control signals.

Preferably, the first rectifying stage 21 includes a first sensing arrangement 210 adapted to detect the first DC current $I1_{DC}$ and the first DC voltage $V1_{DC}$ and provide detection signals indicative of these electric quantities.

The transmitter-side power sub-system 2 further comprises a DC-bus stage 22 electrically coupled with the first rectifying stage 21 and adapted to provide a second DC current $I2_{DC}$ and a second DC voltage $V2_{DC}$.

In some embodiments of the invention, the bus-stage 22 may comprise a capacitive circuit (e.g. a so-called DC-link circuit. In this case, the second DC voltage $V2_{DC}$ provided by the first rectifying stage 21 substantially coincides with the first DC voltage $V1_{DC}$ provided by the first rectifying stage 21. Additionally, the amplitude of the second DC current $I2_{DC}$ and the second DC voltage $V2_{DC}$ provided by the DC bus-stage 22 may be controlled by suitably tuning the duty-cycle of the power switches of the first rectifying stage 21.

According to alternative embodiments (FIG. 2), the bus-stage 22 may include a DC-DC switching converter 220 (e.g. a buck switching converter) that conveniently includes power switches controllable by means of suitable control signals.

Figure 2:
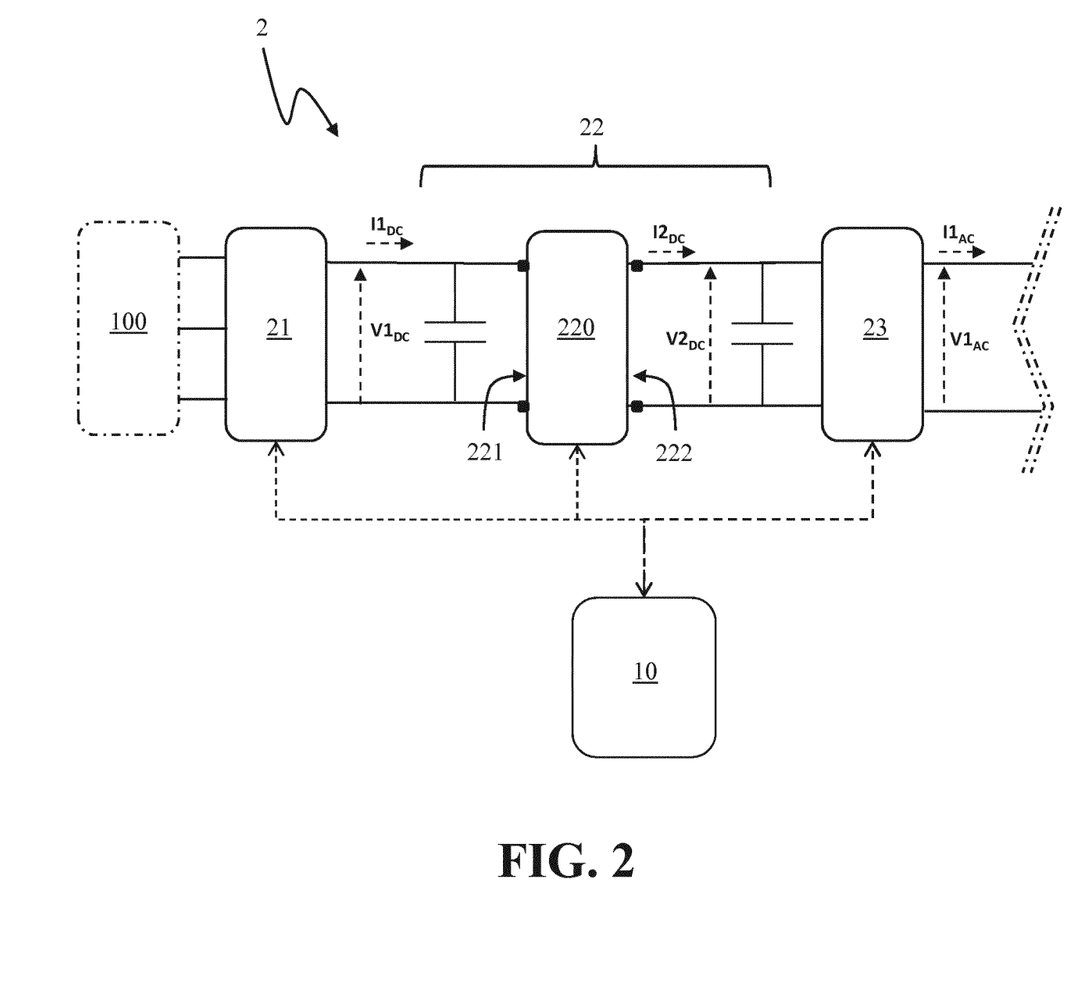
FIG. 2 schematically illustrates a portion the power transfer system, according to the present invention, in a possible embodiment.

The switching converter 220 has a first port 221 electrically coupled with the first rectifying stage 21 and a second port 222 electrically coupled with the inverter stage 23.

At the first port 221, the switching converter 220 receives the first DC voltage $V1_{DC}$ provided by the first rectifying stage 21, whereas, at the second port 222, the switching converter 220 provides the second DC voltage $V2_{DC}$, which is lower than or equal to the first DC voltage $V1_{DC}$.

The amplitude of the second DC current $I2_{DC}$ and the second DC voltage $V2_{DC}$ provided by the DC-bus stage 22 may be controlled by suitably tuning the duty-cycle of the power switches of the DC-DC switching converter 220 and the duty-cycle of the power switches of the first rectifying stage 21.

Preferably, the DC-bus stage 22 comprises a second sensing arrangement 220A adapted to detect the second DC current $I2_{DC}$ and the second DC voltage $V2_{DC}$ and provide detection signals indicative of said electric quantities.

The transmitter-side power sub-system 2 further comprises a DC/AC inverter stage 23 electrically coupled with the first DC-bus stage 22.

The inverter stage 23 is adapted to receive the second DC current $I2_{DC}$ and the second DC voltage $V2_{DC}$, provided by the DC-bus stage 22, and provide a first AC current $I1_{AC}$ and a first AC voltage $V1_{AC}$.

Preferably, the inverter stage 23 comprises a DC/AC switching converter including power switches controllable by means of suitable control signals.

The frequency of the first AC current $I1_{AC}$ and the first AC voltage $V1_{AC}$ provided by the inverter stage 23 may be controlled by suitably tuning the switching frequency of the power switches of such an electronic stage.

Preferably, the inverter stage 23 comprises a third sensing arrangement 230 adapted to detect the first AC current $I1_{AC}$ and the first AC voltage $V1_{AC}$ and provide detection signals indicative of said electric quantities.

At the transmitter-side section, the power transfer system 1 comprises a transmitter-side coil sub-system 3 adapted to exchange AC electric power with the transmitter-side power system 2.

The transmitter-side coil sub-system 3 comprises a transmitter coil 31 adapted to receive the first AC current $I1_{AC}$ provided by the inverter stage 23.

Preferably, the transmitter-side coil sub-system 3 comprises also a first resonant capacitor 32 electrically coupled (e.g. in series as shown in FIG. 1) with the transmitter coil 31.

Preferably, the transmitter-side coil sub-system 3 comprises auxiliary circuits (not shown) operatively associated with the transmitter coil 31, e.g. electronic circuits including temperature sensors, and the like.

At the receiver-side section, the power transfer system 1 comprises a receiver-side coil sub-system 4 comprising a receiver coil 41 inductively coupleable with the transmitter coil 31.

When the transmitter coil 31 and the receiver coil 41 are inductively coupled (obviously with an air gap in therebetween), a first AC current $I1_{AC}$ flowing along the transmitter coil 31 produces a magnetic flux making an induced second AC current $I2_{AC}$ to flow along the receiver coil 41 (and vice-versa). In this way, electric power may be inductively exchanged between the transmitter coil 31 and the receiver coil 41.

Preferably, the receiver-side coil sub-system 4 comprises a second resonant capacitor 42 electrically coupled (e.g. in series as shown in FIG. 1) with the receiver coil 41.

Preferably, the receiver-side coil sub-system 4 comprises auxiliary circuits (not shown) operatively associated with the receiver coil 41, e.g. electronic circuits including temperature sensors, and the like.

As it is evident from the above, the transmitter-side coil sub-system 3 and the receiver-side coil sub-system 4 are adapted to exchange an AC electric power, when the transmitter coil 31 and said receiver coil 41 are inductively coupled.

Conveniently, the receiver-side coil sub-system 4 and the transmitter-side coil sub-system 3 form a resonant electric circuit 340 for the exchange of electric power, when the transmitter coil 31 and said receiver coil 41 are inductively coupled.

In particular, the resonant capacitors 32, 42 are conveniently designed to form a resonant RLC circuit 340 together with the inductance of the transmitter and receiver coils 31, 41 and the equivalent impedance seen at the output terminals of the receiver-side coil sub-system 4.

By operating the inverter stage 23 in such a way that the first AC current $I1_{AC}$ flowing along the transmitter coil 31 has a fundamental frequency close or corresponding to a resonant frequency $f_R$ of the resonant electric circuit 340, AC electric power may be exchanged between the transmitter-side coil sub-system 3 and the receiver-side coil sub-system 4 with high efficiency values despite of the necessarily large air gap between the transmitter coil 31 and the receiver coil 41.

Additionally, the amplitude of the first AC current $I1_{AC}$ flowing along the transmitter coil 31 can be reduced or minimized due to nearly-zero phase shift between said current and the first AC voltage $V1_{AC}$.

At the receiver-side section, the power transfer system 1 comprises a receiver-side power sub-system 5 adapted to exchange AC electric power with the receiver-side coil sub-system 4 and DC electric power Pic with the battery 200.

The receiver-side power sub-system 5 comprises a second rectifying stage 51 electrically coupled with the receiver-side coil sub-system 4 and adapted to receive a second AC current $I2_{AC}$ and second AC voltage $V2_{AC}$ from this latter.

Preferably, the second rectifying stage 51 includes a full-wave diode bridge electrically coupled in cascade with a filter.

As an alternative embodiment, the second rectifying stage 51 may include a switching converter and a filter (not shown) electrically coupled in cascade to provide a suitable rectification and filtering of the currents and voltages received from the receiver-side coil sub-system 4. In this case, the second rectifying stage 51 may include power switches controllable by means of suitable control signals.

The second rectifying stage 51 is electrically coupleable with the battery 200 and is adapted to provide a third DC current $I3_{DC}$ and a third DC voltage $V3_{DC}$ to this latter.

Preferably, the second rectifying stage 51 comprises suitable sensing arrangement 510 adapted to detect the third DC current $I3_{DC}$ and the third DC voltage $V3_{DC}$ and provide detection signals indicative of these electric quantities.

According to the invention, the power transfer system 1 comprises control means 10 to control its operation.

At the transmitter-side section, the control means 10 comprise one or more transmitter-side controllers (collectively indicated with the reference number 6) to control the operation of the transmitter-side power sub-system 2 and the transmitter-side coil sub-system 3.

As an example, the transmitter-side controllers 6 may include a controller to control the operation of the rectifying stage 21, a controller to control the operation of the bus stage 22 (when including a DC-DC switching converter), a controller to control the operation of the inverter stage 23 and, possibly, a controller to control the operation of possible auxiliary circuits included in the transmitter-side coil sub-system 3.

At the receiver-side section, the control means 10 comprise one or more receiver-side controllers (collectively indicated with the reference number 7) to control operation of the receiver-side power sub-system 5 and the receiver-side coil sub-system 4.

As an example, receiver-side controllers 7 may include a controller to control the operation of the rectifying stage 51 and a controller to control the operation of the auxiliary circuits included in the receiver-side coil sub-system 4.

The control means 10 comprise at least a wireless communication channel 8, through which the transmitter-side and receiver-side controllers 6, 7 are capable to mutually communicate. As an example, a Wi-Fi™ communication protocol may be adopted for the communication channel 8.

According to the invention, the control means 10 are capable of suitably controlling the exchange of electric power with the battery 200.

According to some embodiments, the control means 10 are adapted to control a DC electric power $P_{DC}$ exchanged with the battery 200 by controlling the operation of at least one of the rectifying stage 21 and the DC-bus stage 22, namely by controlling the amplitude of the voltages and currents provided by at least one of the rectifying stage 21 and the DC-bus stage 22.

According to other embodiments, the control means 10 are adapted to control a DC electric power $P_{DC}$ exchanged with the battery 200 by controlling the operation of the inverter stage 23, namely by controlling the duty-cycle of the AC electric quantities (e.g. the first AC voltage $V1_{AC}$) provided by said electronic stage.

Preferably, the control means 10 implement a closed-loop control arrangement adapted to process power reference signals $P_{REF}$, which are indicative of desired values for the DC electric power $P_{DC}$ to be exchanged with the battery 200, and suitable detection signals $P_D$ (which are conveniently provided by the sensing arrangement 510) indicative of measured values of the DC electric power $P_{DC}$ actually exchanged with the battery 200.

Preferably, said closed-loop control arrangement is adapted to provide first control signals C1 to control the operation of at least one between the rectifying stage 21 and the DC-bus stage 22 or to control the operation of the inverter stage 23.

As an example, when the DC-bus stage 22 does not include a DC-DC switching converter, said closed-loop control arrangement may be configured to provide first control signals C1 to control the operation of the rectifying stage 21.

As a further example, when the DC-bus stage 22 includes a DC-DC switching converter 220, said closed-loop control arrangement may be configured to provide first control signals C1 to control the rectifying stage 21 or the DC-bus stage 22 or both these electronic stages. Conveniently, the first control signals C1 are adapted to control the duty-cycle of the power switches included in at least one of the rectifying stage 21 and the DC-bus stage 22.

As an additional example, said closed-loop control arrangement may be configured to provide first control signals C1 to control the duty-cycle of the power switches included in the inverter stage 23.

In a practical implementation of the invention, the above-mentioned closed-loop control arrangement is mostly carried out at level of the transmitter-side controllers 6. Conveniently, certain signals, such as the power reference signals $P_{REF}$ and the detection signals $P_D$, may be conveniently transmitted through the wireless communication channel 8 and processed by the transmitter-side controllers 6 to provide the control signals C1.

According to the invention, the control means 10 are capable of providing frequency control functionalities of the first AC current $I1_{AC}$ circulating along the transmitter coil 31.

More particularly, the control means 10 are adapted to control an operating frequency of the first AC current $I1_{AC}$ circulating along the transmitter coil 31 to track a resonant frequency $f_R$ of the resonant electric circuit 340 formed by the transmitted-side coil sub-system 3 and the receiver-side coil sub-system 4, when the transmitter coil 31 and said receiver coil 41 are inductively coupled.

This solution finds its technical grounds in the circumstance that the resonant frequency $f_R$ of the resonant electric circuit 340 is basically subject to variations that may depend on specific operative conditions of the power transfer system 1, such as the mutual positioning between the transmitter coil 31 and the receiver coil 41, temperature variations of some components (e.g. the resonant capacitors 32, 42) of the transmitter-side coil sub-system 3 and the receiver-side coil sub-system 4, arising of saturation phenomena at the transmitter coil 31 and the receiver coil 41, and the like.

For a given operating frequency of the first AC current $I1_{AC}$ flowing along the transmitter coil 31, these variations of the resonant frequency $f_R$ of the resonant electric circuit 340 typically determine corresponding variations of the overall power exchange efficiency $\eta$ of the power transfer system. For the sake of clarity, the overall power exchange efficiency $\eta$ may be conveniently calculated as $\eta = P_{DC}/P_{AC}$, where $P_{AC}$ is the AC electric power exchanged with the electric system 100 and $P_{DC}$ is the DC electric power exchanged with the battery 200.

The entity of these variations of the power exchange efficiency normally depends on differences between the actual operating frequency of the first AC current $I1_{AC}$ circulating along the transmitter coil 31 and the actual resonant frequency $f_R$ of the above-mentioned resonant electric circuit.

Thanks to above-described frequency control functionalities, for any generic operating point of the power transfer system, which is conveniently set by implementing the above-described power control functionalities, possible (often unpredictable) variations of the resonant frequency $f_R$ of the above-mentioned resonant electric circuit can be followed by corresponding variations of the operating frequency of the first AC current $I1_{AC}$ flowing along the transmitter coil 31.

In this way, for any generic operating point, it is possible to maintain the operating frequency of the first AC current $I1_{AC}$ close or substantially coincident the resonant frequency $f_R$ and, consequently, maintain the overall power exchange efficiency at relatively high values despite of possible variations of the operative conditions of said power transfer system.

Conveniently, the control means 10 may control the operating frequency of the first AC current $I1_{AC}$ flowing along the transmitter coil 31 by providing second control signals C2 to control the operation of the inverter stage 23.

Conveniently, the second control signals C2 are adapted to control the switching frequency of the power switches included in inverter stage 23.

Figure 3:
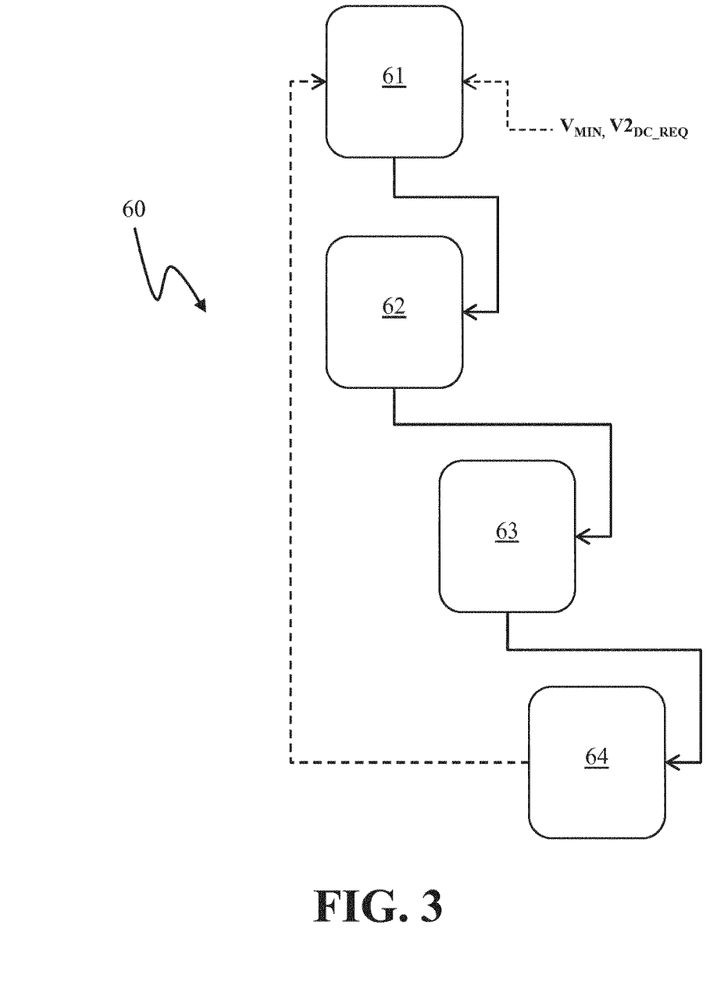
FIG. 3 schematically illustrates a frequency control procedure carried out by the power transfer system, according to the present invention.

According to a preferred embodiment of the invention, the control means 10 are adapted to carry-out a frequency control procedure 60 that provides for imposing frequency variations $\Delta f$ to an operating frequency of the first AC current $I1_{AC}$ circulating along the transmitter coil 31 and provides for observing variations of one or more electric quantities of the power transfer system in response to the imposed frequency variations $\Delta f$ in order in order to track the resonant frequency $f_R$ of the above-mentioned resonant electric circuit 340.

Preferably, the above-mentioned electric quantities include at least one between the second DC voltage $V2_{DC}$ at the DC-bus stage 22 and the overall power exchange efficiency of the power transfer system.

The frequency control procedure 60 comprises the step 61 of controlling the operation of the inverter stage 23 to obtain a first AC current $I1_{AC}$, which circulates along the transmitter coil 31 with a varied frequency $f_2$. This latter is obtained by imposing a frequency variation $\Delta f$ to an initial operating frequency $f_1$ (e.g. the nominal frequency) of the first AC current $I1_{AC}$. In practice, the imposed varied frequency $f_2$ is given by the following relation: $f_2 = f_1 + \Delta f$, where $\Delta f$ may have positive or negative values.

According to some embodiments of the invention, the frequency variation $\Delta f$ has a predefined value (in module).

According to alternative embodiments of the invention, the frequency variation $\Delta f$ may have variable values (in module) that are selectable depending on the calculated variations $\Delta V2_{DC}$, $\Delta \eta$ of the above-mentioned electric quantities $V2_{DC}$, $\eta$. As an example, the frequency variation $\Delta f$ may be selected from a look-up table reporting the frequency variation $\Delta f$ as a function of an electric quantity $V2_{DC}$, $\eta$.

The frequency control procedure 60 comprises the step 62 of calculating variation values $\Delta V2_{DC}$, $\Delta \eta$ of the above-mentioned electric quantities $V2_{DC}$, $\eta$ of the power transfer system in response to the obtaining of a first AC current $I1_{AC}$ having the varied frequency $f_2$.

Conveniently, the variation values $\Delta V2_{DC}$, $\Delta \eta$ are calculated when the above-mentioned electric quantities $V2_{DC}$, $\eta$ have reached a steady-state in response to the imposed frequency perturbation of the first AC current $I1_{AC}$.

Conveniently, the variation values $\Delta V2_{DC}$, $\Delta \eta$ of the above-mentioned electric quantities $V2_{DC}$, $\eta$ may be calculated by the control means 10 basing on detection signals D1 provided by suitable sensing arrangements, e.g. the sensing arrangements 210, 220A, 510.

The frequency control procedure 60 comprises the step 63 of determining whether the varied frequency $f_2$ of the first AC current $I1_{AC}$ is closer to or farther from the actual resonant frequency $f_R$ of the resonant electric circuit 340.

Such a determination step is conveniently carried out basing on the calculated variation values $\Delta V2_{DC}$, $\Delta \eta$ of the aforesaid electric quantities $V2_{DC}$, $\eta$.

According to a possible determination criterion, a positive variation value $\Delta V2_{DC}$ of the second DC voltage $V2_{DC}$ at the DC-bus stage 22 indicates that the varied frequency $f_2$ is farther from the actual resonant frequency $f_R$ whereas a negative variation value $\Delta V2_{DC}$ indicates that the varied frequency $f_2$ is closer to the actual resonant frequency $f_R$.

According to another determination criterion, a positive variation value $\Delta \eta$ of the overall power exchange efficiency $\eta$ indicates that the varied frequency $f_2$ is closer to the actual resonant frequency $f_R$ whereas a negative variation value $\Delta \eta$ indicates that the varied frequency $f_2$ is farther from the actual resonant frequency $f_R$.

Other determination criteria based on combined calculated variation values $\Delta V2_{DC}$, $\Delta \eta$ may be adopted according to the needs.

The frequency control procedure 60 comprises the step 64 of controlling the operation of the inverter stage 23 to obtain a first AC current $I1_{AC}$ circulating along the transmitter coil 31 having an operating frequency that is set depending on the results of the determination process carried out at the previous step 63.

If it is determined that the varied frequency $f_2$ of the first AC current $I1_{AC}$ is closer to the actual resonant frequency $f_R$ of the resonant electric circuit 340, the varied frequency $f_2$ is set as new operating frequency for the first AC current $I1_{AC}$ and the control means 10 control the operation of the inverter stage 23 in such a way to keep on obtaining a first AC current $I1_{AC}$ having such a new operating frequency $f_2$.

Additionally, in this case, the control procedure 60 will be repeated by imposing a new frequency variation $\Delta f_{NEW}$ to perturb the new operating frequency $f_2$, which has the same sign of the previous frequency variation Δf adopted to perturb the operating frequency $f_1$. In practice, the following condition is adopted: sgn(Δ$f_{NEW}$)=sgn(Δf).

If it is determined that the varied frequency $f_2$ of the first AC current $I1_{AC}$ is farther from the actual resonant frequency $f_R$ of the resonant electric circuit 340, the varied frequency $f_2$ is disregarded and the control means 10 control the operation of the inverter stage 23 in such a way to keep of obtaining a first AC current $I1_{AC}$ with the initial operating frequency Additionally, in this case, the control procedure 60 will be repeated by imposing a new frequency variation Δ$f_{NEW}$ to perturb the restored operating frequency $f_1$, which has an opposite sign with respect the previous frequency variation Δf adopted to perturb the operating frequency $f_1$. In practice, the following condition is adopted: sgn(Δ$f_{NEW}$) ≠sgn(Δf). It is evident from the above how the frequency control procedure 60 allows setting the operating frequency of the first AC current $I1_{AC}$ in such a way to follow any possible variations of the resonance frequency $f_R$ of the resonant electric circuit 340.

As mentioned above, this allows optimizing the overall power exchange efficiency for any generic operating point of the power transfer system, even in presence of variations of the operative conditions of this latter.

Preferably, the aforesaid frequency control procedure 60 is cyclically repeated during the operating life of the power transfer system, e.g. with repetition periods of 10 s. In this way, the resonant condition of the resonant electric circuit 340 may be constantly tracked during the operating life of the power transfer system.

In a practical implementation of the invention, the frequency control procedure 60 is conveniently carried out at level of the transmitter-side controllers 6. To this aim, the transmitter-side controllers 6 may receive suitable detection signals D2, D3 from the sensing arrangements 210, 220A and 230 and from the sensing arrangement 510. As indicated above, detection signals D3 from the sensing arrangement 510 may be suitably transmitted to the transmitter-side controllers 6 through the receiver-side controllers 7 and the communication channel 8.

In the embodiments (FIG. 2) in which the bus-stage 22 includes a DC-DC switching converter 220, the control means 10 may be suitably configured to provide voltage control functionalities of the operating DC voltages $V1_{DC}$, $V2_{DC}$ at the first and second ports 221, 222 of the DC/DC converter 220 to reduce power losses at the DC-bus stage 22.

According to said voltage control functionalities, a second DC voltage $V2_{DC}$ requested to be provided at the second port 222 is obtained by means of a voltage regulation carried out alternatively by the first rectifying stage 21 or the DC/DC switching converter 220.

The electronic stage 21 or 220 to be employed for providing such a voltage regulation is selected depending on the requested values $V2_{DC\_REQ}$ for the second DC voltage $V2_{DC}$ (which has to be provided at the second port 222 of the DC/DC converter 220) with respect to a minimum value $V_{MIN}$ of a first DC voltage $V1_{DC}$ that can be made available by the first rectifying stage 21 at the first port 221 of the DC/DC converter 220.

The minimum value $V_{MIN}$ may be set depending on the design of the electronic stage 21 and/or depending on the power control functionalities carried out by the control means 10.

The requested values $V2_{DC\_REQ}$ for the second DC voltage $V2_{DC}$ mostly depend on the operating set points of the power transfer system (conveniently controlled by implementing the above-described power control functionalities).

If a requested value for the second DC voltage $V2_{DC}$ to be provided at the second port 222 of the DC/DC converter 220 is lower than or equal to said possible minimum value $V_{MIN}$ (in practice if $V2_{DC\_REQ}<=V_{MIN}$) the regulation of the second DC voltage $V2_{DC}$ can be carried out by the DC/DC converter 220.

In this case, the control means 10 control the operation of the first rectifying stage 21 to obtain a first DC voltage $V1_{DC}$ set at the minimum value $V_{MIN}$ and control the operation of the DC/DC converter 220 to obtain a second DC voltage $V2_{DC}$ having the requested value $V2_{DC\_REQ}$.

In this way, power losses at the DC/DC converter 220 are reduced as power switches are subject to lower direct voltages (i.e. lower drain-source or collector-emitter voltages depending on the type of said power switches).

If a requested value for the second DC voltage $V2_{DC}$ is higher than the minimum value $V_{MIN}$ (in practice if $V2_{DC\_REQ}>V_{MIN}$), the regulation of the second DC voltage $V2_{DC}$ has to be carried out by the first rectifying stage 21.

In this case, the control means 10 control the operation of the first rectifying stage 21 to obtain a first DC voltage $V1_{DC}$ having a value equal to the requested value $V2_{DC\_REQ}$ for said second DC voltage $V2_{DC}$ and control the operation of the DC/DC converter 220 to obtain a second DC voltage $V2_{DC}$ equal to said first DC voltage $V1_{DC}$.

Again, power losses at the DC/DC converter 220 are reduced as overall commutations of power switches are reduced (i.e. power switches have a duty-cycle equal to 1).

The above described solution is quite advantageous as it remarkably facilitates the obtaining of a given DC electric power $P_{DC}$ exchanged with the battery 200 at a given overall power transfer efficiency η.

In a practical implementation of the invention, the above mentioned voltage control functionalities are conveniently carried out at level of the transmitter-side controllers 6. To this aim, the transmitter-side controllers 6 may receive suitable detection signals D4 from the sensing arrangements 210, 220A.

The control means 10 may provide the above mentioned voltage control functionalities by providing third control signals C3 to control the operation of at least one between the rectifying stage 21 and the DC/DC converter stage 220.

Conveniently, the third control signals C3 are adapted to control the duty-cycle of the power switches included in at least one of the rectifying stage 21 and in the DC/DC converter stage 220.

Figure 4:
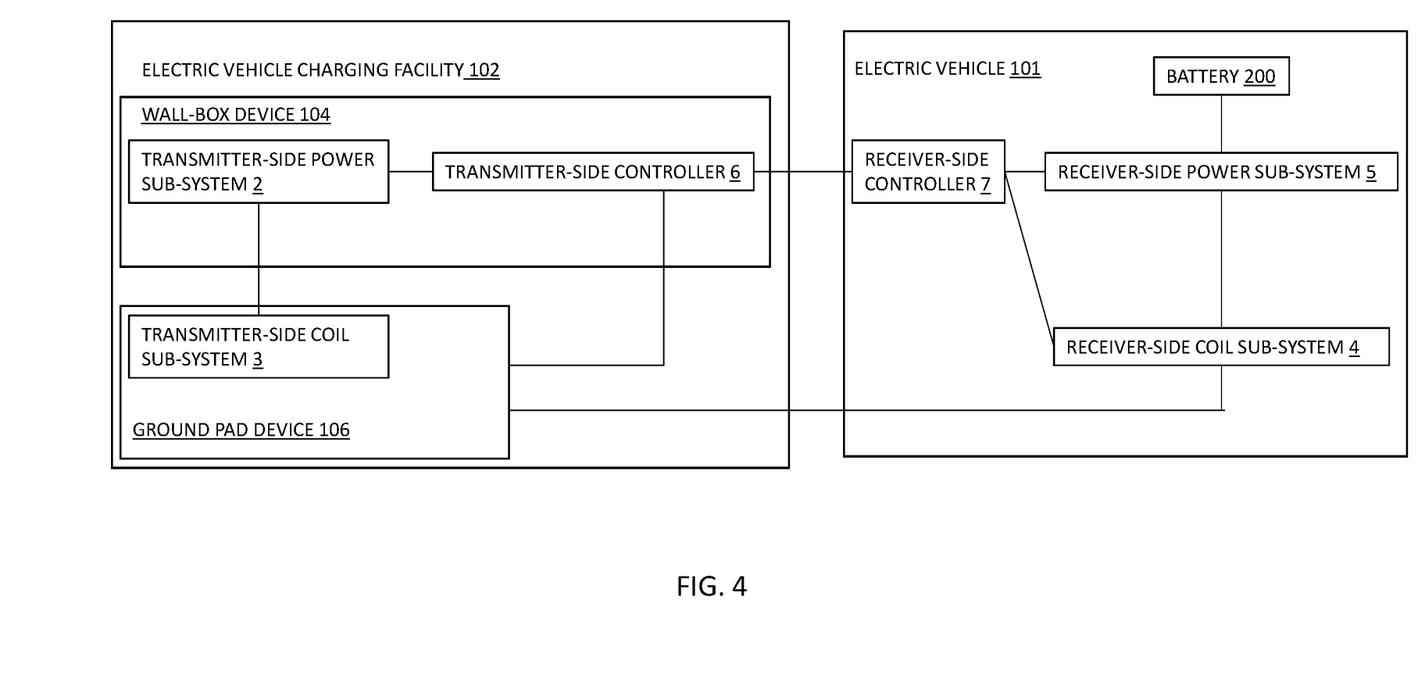
FIG. 4 is a schematic diagram of an electric vehicle charging facility for an electric vehicle.

In a practical implementation of the invention, the transmitter-side power sub-system 2 may be arranged in a wall-box device 104 for an electric vehicle charging facility 102, e.g. for residential purposes (see FIG. 4). Such a wall-box device 104 may conveniently include the one or more transmitter-side controllers 6 operatively associated with the electronic stages of the transmitter-side power sub-system 2.

The transmitter-side coil sub-system 3 may be arranged or embedded in a ground pad device 106 for an electric vehicle charging facility 102, e.g. for residential purposes. Such a ground pad device 106 may conveniently include possible one or more transmitter-side controllers 6 operatively associated to transmitter-side coil sub-system 3.

The receiver-side coil sub-system 4, the receiver-side power sub-system 5 and the receiver-side controllers 7 are arranged (together with the battery 200) on board an electric vehicle 101.

In a further aspect, the present invention relates to a control method for controlling the operation of a power transfer system as described above.

The method, according to the invention, comprises controlling a DC electric power $P_{DC}$ exchanged with the battery 200 by controlling operation of at least one between the first rectifying stage 21 and the DC-bus stage 22 and controlling an operating frequency of a first AC current $I1_{AC}$ circulating along the transmitter coil 31 to track a resonant frequency $f_R$ of the resonant electric circuit 340 formed by the transmitted-side coil sub-system 3 and said receiver-side coil sub-system 4, when the transmitter coil 31 and said receiver coil 41 are inductively coupled.

Preferably, the method, according to the invention, comprises providing frequency variations $\Delta f$ of an operating frequency $f_1$ of an first AC current $I1_{AC}$ circulating along the transmitter coil 31 and observing variations $\Delta V2_{DC}$, $\Delta \eta$ of one or more electric quantities $V2_{DC}$, $\eta$ of the power transfer system in response to said frequency variations $\Delta f$ to track the above-mentioned resonant frequency $f_R$.

Preferably, the method, according to the invention, comprises the following steps:
- controlling the operation of the inverter stage 23 to obtain a first AC current $I1_{AC}$ circulating along the transmitter coil 31 with a varied frequency $f_2$ obtained by imposing a frequency variation $\Delta f$ of an operating frequency $f_1$ of said first AC current;
- calculating variations $\Delta V2_{DC}$, $\Delta \eta$ of one or more electric quantities $V2_{DC}$, $\eta$ of the power transfer system in response to the obtaining of said first AC current $I1_{AC}$ having said varied frequency $f_2$;
- determining whether said varied frequency $f_2$ is closer to or farther from said resonant frequency $f_R$ depending on the calculated variations $\Delta V2_{DC}$, $\Delta \eta$ of said one or more electric quantities ($V2_{DC}$, $\eta$);
- controlling the operation of the inverter stage 23 to obtain said first AC current $I1_{AC}$ with an operating frequency set depending on the results of said determination.

Preferably, if it is determined that the varied frequency $f_2$ of the first AC current $I1_{AC}$ is closer to the actual resonant frequency $f_R$ of the resonant electric circuit 340, the varied frequency $f_2$ is set as new operating frequency of the of the first AC current $I1_{AC}$ and the operation of the inverter stage 23 is controlled in such a way to keep on obtaining a first AC current $I1_{AC}$ having such a new operating frequency $f_2$.

Additionally, in this case, the control procedure 60 is repeated by imposing a new frequency variation $\Delta f_{NEW}$ to perturb the new operating frequency $f_2$, which has the same sign of the previous frequency variation $\Delta f$ adopted to perturb the operating frequency $f_1$.

Preferably, if it is determined that the varied frequency $f_2$ of the first AC current $I1_{AC}$ is farther than the actual resonant frequency $f_R$ of the resonant electric circuit 340, the varied frequency $f_2$ is disregarded and the operation of the inverter stage 23 is controlled in such a way to keep of obtaining a first AC current $I1_{AC}$ with the initial operating frequency $f_1$.

Additionally, in this case, the control procedure 60 is repeated by imposing a new frequency variation $\Delta f_{NEW}$ to perturb the restored operating frequency $f_1$, which has an opposite sign with respect the previous frequency variation $\Delta f$ adopted to perturb the operating frequency $f_1$.

Preferably, the aforesaid control steps of the method, according to the invention, are cyclically repeated during the operating life of the power transfer system.

In the embodiments (FIG. 2) in which the bus-stage 22 includes a DC-DC switching converter 220, the method, according to the invention, preferably comprises the following steps:
if a value requested for a second DC voltage $V2_{DC}$ at the second port 222 of the DC/DC converter 220 is lower or equal to a possible minimum value $V_{MIN}$ for a first DC voltage $V1_{DC}$ at the first port 221 of the DC/DC converter 220:
- controlling operation of the first rectifying stage 21 to obtain said first DC voltage $V1_{DC}$ set at said minimum value $V_{MIN}$;
- controlling operation of the DC/DC converter 220 to obtain said second DC voltage $V2_{DC}$ having said requested value;

if a value requested for the second DC voltage $V2_{DC}$ at the second port 222 is higher than a possible minimum value $V_{MIN}$ for the first DC voltage $V1_{DC}$ at the first port 221:
- controlling operation of the first rectifying stage 21 to obtain a first DC voltage $V1_{DC}$ having a value equal to the value requested for said second DC voltage $V2_{DC}$;
- controlling operation of the DC/DC converter 220 to obtain a second DC voltage $V2_{DC}$ equal to said first DC voltage $V1_{DC}$.

The power transfer system, according to the invention, allows achieving the intended aims and objects.

The power transfer system, according to the invention, includes a control architecture ensuring a suitable transmission of electric power to the battery on board a vehicle, in accordance with a given power transfer profile, and, at the same time, capable of providing frequency control functionalities directed to optimize the overall power exchange efficiency of said power transfer system.

The power transfer system, according to the invention, ensures good performances in terms of reliability, even when unpredictable changes in operating conditions occur.

The power transfer system, according to the invention, can be easily arranged and produced at industrial level, at competitive costs with respect to similar systems of the state of the art.

The invention claimed is:

1. A power transfer system for exchanging electric power between an electric power system and a battery of an electric vehicle
comprising:
- a transmitter-side power sub-system adapted to exchange AC electric power with said electric power system, said transmitter-side power sub-system comprising a first rectifying stage electrically coupleable with said electric power system, a DC-bus stage electrically coupled with said first rectifying stage and an inverter stage electrically coupled with said DC-bus stage;
- a transmitter-side coil sub-system adapted to exchange AC electric power with said transmitter-side power sub-system, said transmitter-side coil sub-system comprising a transmitter coil electrically coupled with said inverter stage;
- a receiver-side coil sub-system comprising a receiver coil inductively coupleable with said transmitter coil;
- a resonant electric circuit for the exchange of AC electric power comprising an inductance of said transmitter coil, an inductance of said receiver coil, and resonant capacitors, when said transmitter coil and said receiver coil are inductively coupled, wherein a resonant frequency of the resonant electric circuit is defined by the inductance of said transmitter coil, the inductance of said receiver coil, and the resonant capacitors;
- a receiver-side power sub-system adapted to exchange AC electric power with said receiver-side coil sub-system and DC electric power with said battery, said receiver-side power sub-system comprising a second rectifying stage electrically coupled with said receiver coil; and control means comprising transmitter-side control means, adapted to control operation of said transmitter-side power sub-system and transmitter-side coil sub-system, and receiver-side control means adapted to control operation of said receiver-side coil sub-system and receiver-side power sub-system, said transmitter-side and receiver-side control means configured to mutually communicate through a wireless communication channel;

wherein said control means are adapted to control a DC electric power exchanged with said battery and are adapted to control an operating frequency of a first AC current circulating along said transmitter coil to track the resonant frequency of the resonant electric circuit formed by said transmitter-side coil sub-system and said receiver-side coil sub-system, wherein said control means are adapted to control an operating frequency of the first AC current to account for variations in the resonant frequency due to variations in the inductance of the transmitter coil, the inductance of the receiver coil, and/or the resonant capacitors by:

tracking the resonant frequency by providing frequency variations of the operating frequency of said first AC current and observe variations of one or more electric quantities of said power transfer system in response to said frequency variations to track said resonant frequency, wherein said control means are adapted to:

control operation of said inverter stage to obtain said first AC current with a varied frequency obtained by imposing a frequency variation of the operating frequency of said first AC current;

calculate variations of the one or more electric quantities of said power transfer system in response to the obtaining of said first AC current having said varied frequency;

determine whether said varied frequency is closer to or farther from said resonant frequency depending on the calculated variations of said one or more electric quantities; and control operation of said inverter stage to obtain said first AC current with the operating frequency set depending on the results of said determination.

2. The power transfer system, according to claim 1, wherein said frequency variation has a predefined value.

3. The power transfer system, according to claim 1, wherein said frequency variation has a variable value selectable depending on the calculated variations of said one or more electric quantities.

4. The power transfer system, according to claim 3, wherein said one or more electric quantities include a DC voltage at said DC-bus stage.

5. The power transfer system, according to claim 4, wherein said one or more electric quantities include a power exchange efficiency of said power transfer system.

6. The power transfer system, according to claim 3, wherein:

said transmitter-side power sub-system and said transmitter-side control means are arranged in a wall-box device for an electric vehicle charging facility;

said transmitter-side coil sub-system is arranged or embedded in a ground pad device for the electric vehicle charging facility; and said receiver-side coil sub-system, said receiver-side power sub-system, said receiver-side control means and said battery are arranged on board said electric vehicle.

7. The power transfer system, according to claim 1, wherein said DC-bus stage includes a DC/DC converter and has a first port electrically coupled with said first rectifying stage and a second port electrically coupled with said inverter stage, said control means being adapted to:

if a value requested for a second DC voltage at said second port is lower than or equal to a possible minimum value for a first DC voltage at said first port:

control operation of said first rectifying stage to obtain a first DC voltage having said minimum value; and control operation of said DC/DC converter to obtain a second DC voltage having said requested value; and if a value requested for a second DC voltage at said second port is higher than a possible minimum value for a first DC voltage at said first port:

control operation of said first rectifying stage to obtain a first DC voltage having a value equal to the value requested for said second DC voltage; and control operation of said DC/DC converter to obtain a second DC voltage equal to said first DC voltage.

8. The power transfer system, according to claim 1, wherein:

said transmitter-side power sub-system and said transmitter-side control means are arranged in a wall-box device for an electric vehicle charging facility;

said transmitter-side coil sub-system is arranged or embedded in a ground pad device for the electric vehicle charging facility; and said receiver-side coil sub-system, said receiver-side power sub-system, said receiver-side control means and said battery are arranged on board said electric vehicle.

9. The power transfer system, according to claim 1, wherein said one or more electric quantities include a DC voltage at said DC-bus stage.

10. The power transfer system, according to claim 1, wherein said one or more electric quantities include a power exchange efficiency of said power transfer system.

11. The power transfer system of claim 1, wherein as the resonant capacitors, the transmitter-side coil sub-system further comprises a first resonant capacitor electrically coupled to the transmitter coil, and the receiver-side coil sub-system further comprises a second resonant capacitor electrically coupled to the receiver coil, and the transmitter coil, the first resonant capacitor, the receiver coil, and the second resonant capacitor form the resonant electric circuit.

12. A method for controlling a power transfer system for exchanging electric power between an electric power system and a battery of an electric vehicle, said power transfer system comprising:

a transmitter-side power sub-system adapted to exchange AC electric power with said electric power system, said transmitter-side power sub-system comprising a first rectifying stage electrically coupleable with said electric power system, a DC-bus stage electrically coupled with said first rectifying stage and an inverter stage electrically coupled with said DC-bus stage;

a transmitter-side coil sub-system adapted to exchange AC electric power with said transmitter-side power sub-system, said transmitter-side coil sub-system comprising a transmitter coil electrically coupled with said inverter stage;

a receiver-side coil sub-system comprising a receiver coil inductively coupleable with said transmitter coil;

a resonant electric circuit for the exchange of AC electric power including an inductance of the transmitter coil, an inductance of the receiver coil, and resonant capacitors, when said transmitter coil and said receiver coil are inductively coupled, wherein a resonant frequency of the resonant electric circuit is defined by the inductance of the transmitter coil, the inductance of the receiver coil, and the resonant capacitors; and a receiver-side power sub-system adapted to exchange AC electric power with said receiver-side coil sub-system and DC electric power with said battery, said receiver-side power sub-system comprising a second rectifying stage electrically coupled with said receiver coil; and said method comprising:

controlling a DC electric power exchanged with said battery and controlling an operating frequency of a first AC current circulating along said transmitter coil to track the resonant frequency of the resonant electric circuit formed by said transmitter-side coil sub-system and said receiver-side coil sub-system;

controlling an operating frequency of the first AC current to account for variations in the resonant frequency due to variations in the inductance of the transmitter coil, the inductance of the receiver coil, and/or the resonant capacitors by:

tracking the resonant frequency by providing frequency variations of the operating frequency of said first AC current and observing variations of one or more electric quantities of said power transfer system in response to said frequency variations to track said resonant frequency;

controlling operation of said inverter stage to obtain said first AC current with a varied frequency obtained by imposing a frequency variation of the operating frequency of said first AC current;

calculating variations of the one or more electric quantities of said power transfer system in response to the obtaining of said first AC current having said varied frequency;

determining whether said varied frequency is closer to or farther from said resonant frequency depending on the calculated variations of said one or more electric quantities; and controlling operation of said inverter stage to obtain said first AC current with the operating frequency set depending on the results of said determination.

13. The method, according to claim 12, wherein said DC-bus stage includes a DC/DC converter and has a first port electrically coupled with said first rectifying stage and a second port electrically coupled with said inverter stage, said method comprising:

if a value requested for a second DC voltage at said second port is lower than or equal to a possible minimum value for a first DC voltage at said first port:

controlling operation of said first rectifying stage to obtain a first DC voltage having said minimum value; and controlling operation of said DC/DC converter to obtain a second DC voltage having said requested value; and if a value requested for a second DC voltage at said second port is higher than a possible minimum value for a first DC voltage at said first port:

controlling operation of said first rectifying stage to obtain a first DC voltage having a value equal to the value requested for said second DC voltage; and controlling operation of said DC/DC converter to obtain a second DC voltage equal to said first DC voltage.

14. The method of claim 12, wherein as the resonant capacitors, the transmitter-side coil sub-system further includes a first resonant capacitor electrically coupled to the transmitter coil, and the receiver-side coil sub-system further includes a second resonant capacitor electrically coupled to the receiver coil, and the transmitter coil, the first resonant capacitor, the receiver coil, and the second resonant capacitor form the resonant electric circuit.

15. A power transfer system for exchanging electric power between an electric power system and a battery of an electric vehicle, comprising:

a transmitter-side power sub-system adapted to exchange AC electric power with said electric power system, said transmitter-side power sub-system comprising a first rectifying stage electrically coupleable with said electric power system, a DC-bus stage electrically coupled with said first rectifying stage and an inverter stage electrically coupled with said DC-bus stage;

a transmitter-side coil sub-system adapted to exchange AC electric power with said transmitter-side power sub-system, said transmitter-side coil sub-system comprising a transmitter coil electrically coupled with said inverter stage;

a receiver-side coil sub-system comprising a receiver coil inductively coupleable with said transmitter coil;

a resonant RLC electric circuit for the exchange of AC electric power comprising an inductance of said transmitter coil, an inductance of said receiver coil, resonant capacitors, and an equivalent impedance, when said transmitter coil and said receiver coil are inductively coupled, wherein a resonant frequency of the resonant RLC electric circuit is defined by the inductance of said transmitter coil, the inductance of said receiver coil, and the resonant capacitors;

a receiver-side power sub-system adapted to exchange AC electric power with said receiver-side coil sub-system and DC electric power with said battery, said receiver-side power sub-system comprising a second rectifying stage electrically coupled with said receiver coil; and control means comprising transmitter-side control means, adapted to control operation of said transmitter-side power sub-system and transmitter-side coil sub-system, and receiver-side control means adapted to control operation of said receiver-side coil sub-system and receiver-side power sub-system, said transmitter-side and receiver-side control means configured to mutually communicate through a wireless communication channel, wherein said control means are adapted to control a DC electric power exchanged with said battery and are adapted to control an operating frequency of a first AC current circulating along said transmitter coil to track the resonant frequency of the resonant RLC electric circuit formed by said transmitter-side coil sub-system and said receiver-side coil sub-system, wherein said control means are adapted to control an operating frequency of the first AC current to account for variations in the resonant frequency due to variations in the inductance of the transmitter coil, the inductance of the receiver coil, and/or the resonant capacitors by:

tracking the resonant frequency by providing frequency variations of the operating frequency of said first AC current and observe variations of one or more electric quantities of said power transfer system in response to said frequency variations to track said resonant frequency, wherein said control means are adapted to:
control operation of said inverter stage to obtain said first AC current with a varied frequency obtained by imposing a frequency variation of the operating frequency of said first AC current;

calculate variations of the one or more electric quantities of said power transfer system in response to the obtaining of said first AC current having said varied frequency;

determine whether said varied frequency is closer to or farther from said resonant frequency depending on the calculated variations of said one or more electric quantities; and control operation of said inverter stage to obtain said first AC current with the operating frequency set depending on the results of said determination.

16. The power transfer system of claim 15, wherein the equivalent impedance of the resonant RLC electric circuit is an equivalent impedance seen at output terminals of the receiver-side coil sub-system.

* * * * *